3,297,616
SELF-CURING SILICATE AND ACRYLATE COATINGS
John R. Fisher, Jr., Oakmont, and Woodrow E. Kemp, Pittsburgh, Pa., assignors to Koppers Company, Inc., a corporation of Delaware
No Drawing. Filed Dec. 2, 1963, Ser. No. 327,496
2 Claims. (Cl. 260—29.6)

This invention relates to the treatment of metal surfaces with protective silicate coatings, and more particularly, it relates to a pigmented silicate finish coating which requires no further curing.

Coatings formed by the reaction of metal ions, such as zinc and lead, with soluble silicates for protection of metal against corrosion have been used extensively in industry. After being applied to the metal surface the silicates generally remain soluble and can readily be removed on exposure to water unless they are cured to form insoluble silicates. It has been a common practice to heat cure these coatings at temperatures up to about 500° F. so that the coating becomes hard, chemically insoluble, and impermeable to solvents. Another procedure for curing silicate coatings has been to subject the coating to an acid cure by either treating directly with a mineral acid, or by treating with an acid salt capable upon hydrolysis of liberating an acid radical which will react with the silicate film. Unfortunately, air drying, under ordinary conditions, fails to effect the required hardening and insolubilizing of the coating except upon prolonged exposure.

It is therefore an object of the present invention to provide a coating composition which is self-curing in air under ordinary conditions.

In accordance with the present invention, we have discovered a pigmented coating composition for application over metal surfaces comprising an admixture of a soluble alkali metal silicate solution, an acrylic resin emulsion, a pigment blending component, and sufficient water to adjust the viscosity for the mode of application. The pigment component is comprised of a coloring pigment, a filler, and a metal salt capable of reacting with said alkali metal silicate to yield a hard insoluble coating.

A particular advantage of this coating composition is that it requires no further curing either by subjecting the film to heat or chemical curing agents. The inclusion of a synthetic resin emulsion in our novel formulation provides an insoluble surface film which protects the silicates for a time sufficient to permit exposure of the silicates to the air atmosphere to form insoluble silicates. The novel coating composition may advantageously be applied over galvanized steel, sand blasted iron or steel, and metal which has been primed with inorganic zinc coatings.

The coating composition is prepared with water soluble alkali metal silicates such as sodium silicate, potassium silicate, lithium silicate, or a mixture of such silicates. Preferably sodium silicate is used because of its low cost and commercial availability. The alkali metal silicates are advantageously of the low alkaline type in which the maximum ratio of alkali metal oxide to silicon dioxide is about 1:2. The minimum ratio varies for the individual silicates, i.e., for potassium silicate the

is 1:3.9, and for sodium silicate the $Na_2O:SiO_2$ is 1:3.75. Such solutions are commercially available, for example, as "Kasil No. 1" and "S 35." These aqueous silicate solutions have a specific gravity of about 1.3 and comprise about 27 percent by weight of alkali metal silicate.

The acrylic resin emulsion useful in the present invention are aqueous dispersions of a water-insoluble interpolymer containing a water-soluble, non-ionic polyethoxyethanol emulsifying agent and having a pH between eight and ten. The interpolymer is comprised of: (1) units having carboxylated groups from at least one polymerizable alpha, beta-unsaturated vinylidine carboxylic acid; (2) units from at least one polymerizable ester which by itself forms soft polymers and which is selected from the class consisting of esters of acrylic acid and primary alkanols of 1–18 carbon atoms, esters of acrylic acid and secondary alkanols of 1–18 carbon atoms, esters of methacrylic acid and primary alkanols of 5–18 carbon atoms, and esters of methacrylic acid and secondary alkanols of 5–18 carbon atoms; and (3) units of at least one polymerizable monovinylidine compound which by itself forms a hard polymer and which is selected from the class consisting of alkyl methacrylates in which the alkyl group has 1–4 carbon atoms, t-amyl methacrylate, t-butyl methacrylate, t-amyl acrylate, cyclohexyl acrylate, and cyclohexyl methacrylate. The carboxylate units constitute between 0.5 to 2.5 percent of the interpolymer; the proportion of units from the soft polymer-forming ester is sufficient to cause the dispersion of interpolymer to form adhesive and cohesive films at an application temperature of about 35° C.; and the ratio of units from said ester to units from the vinylidine compound is from between 9:1 and 20:1.

Typical of the foregoing resin emulsions are those sold under the trademark "Rhoplex AC–33" and "Rhoplex AC–55." "Rhoplex AC–33," a copolymer of ethyl acrylate and methyl methacrylate, is a milky liquid containing about 46 percent solids, has a viscosity at 25° C. of 60–80 ku.; a specific gravity at 25° C. of 1.04; weighs about 8.67 pounds per gallon and has a pH of 9 to 9.5. "Rhoplex AC–55" has a solids content of 54–55 percent, a specific gravity of 1.08 and a milky liquid appearance.

In the preparation of the novel coating composition, the soluble alkali metal silicate solution and the acrylic resin emulsion are preferably combined as a silicate-resin component.

The pigment blending component is prepared in the form of an aqueous paste comprising water, one or more white or colored pigments, a reinforcing pigment or filler and a metal salt which forms an insoluble silicate. For the preparation of a pigment blending component in the form of a white paste, any suitable white inorganic pigment which is insoluble in the alkali metal silicate component may be used such as, for example, titanium dioxide, zinc oxide and the like. Where a colored pigmented blending component is to be prepared, any suitable colored pigment which is insoluble in the alkali metal silicate may be used. Examples of suitable colored pigments include red, yellow, or black iron oxides, chromium oxides, carbon black, etc.

As reinforcement pigments or fillers, there may be used any suitable members of the commonly used pigments of this type such as for example, mica, asbestine, asbestos, talc, clay, barytes, and similar materials. These fillers are preferably used in very finely divided form depending upon the particular application.

The metal salts furnish the reactive ingredient in the pigmented blending component. These salts, which are herein defined to include the oxides, react with the silicate to form insoluble silicate compounds of variable composition thereby yielding insoluble hard films of the finish or overcoat of the present invention. While any metal capable of thus entering into the reaction with the silicate component may be utilized, the metal salts which have been found especially suitable are those of metal group IIA, IIB, III, IVB VIIB, and VIII of the Periodic Table.

Such metals include, for example, aluminum, barium, calcium, magnesium, manganese, lead, and zinc. These are used in the form of metal salts which in an aqueous medium give a hydrogen ion concentration of $10^{-7}$ or less, i.e., a pH of 7.0 and above. Typical of such salts are the carbonates and oxides.

The two components are supplied in separate packages and are mixed just prior to application to form a smooth suspension which becomes hard and insoluble following application. The mixture is easily applied by conventional spray gun or brush means and no special equipment is required. Advantageously, the coating film should be less than five mils and preferably two to three mils in thickness. For repair or retouching purposes the finish or overcoat of this invention may be reapplied over itself or over either new or old silicate type coats.

The range of material for manufacturing the self-curing silicate coating is (based on 100 percent by weight of the final composition):

| Ingredient | Percent |
|---|---|
| Alkali metal silicate | [1] 10–30 |
| Acrylic resin emulsion | [1] 4–15 |
| Colored pigments | 15–30 |
| Fillers | 10–20 |
| Metal salts | 2–6 |
| Water (to adjust the viscosity for the mode of application). | |

[1] Aqueous medium.

A typical composition may be made, for example, by mixing 20 parts of a 27 percent aqueous potassium silicate solution, with eight parts of a 46 percent solids acrylic resin emulsion, 22 parts of titanium dioxide, 11 parts of barium sulfate, four parts of zinc oxide, and 35 parts of water. Another composition could involve 15 parts of a 27 percent aqueous sodium silicate solution, nine parts of a 46 percent solid acrylic emulsion latex, 25 parts of chrome green light, ten parts of asbestine, five parts of lead carbonate and 36 parts of water.

The water content of the formulation to a large extent depends upon the viscosity requirements of the final composition which may vary to some extent, for example, on the mode of application for which it is intended, i.e., brushing and spraying. For most uses the viscosity of the composition should be in a range of about 70–85 Krebs units at 25° C. Generally the water content of the formulation may be determined on the basis that the novel coating composition has a total solids content of 35–60 percent.

Our invention is further illustrated by the following examples.

Example I

A silicate-resin component was prepared by mixing 472 grams of potassium silicate having a ratio $K_2O:SiO_2$ of 1:3.9 (Kasil No. 1) with 175 grams of acrylic resin emulsion (Rhoplex AC–33) and 353 grams of a two percent aqueous sodium alginate solution until a homogeneous mixture of 1000 grams was obtained. Then a pigment component was prepared by dispersing in a Cowles mill 1200 grams of titanium dioxide, 200 grams zinc oxide, 600 grams barium sulfate (barytes) and 1000 grams of water to give a dispersion having a weight of 3000 grams.

Shortly before using, 50 grams of silicate-resin component was gradually added with agitation to 100 grams of the pigment component. The coating composition was sprayed on sheets of galvanized steel to a film thickness of three mils. The coating dried to the touch in ten minutes and became water insoluble in about two hours. A specimen of the coated steel was tested in a conventional manner in a salt vapor cabinet for 1,000 hours and showed no deterioration of the surface. After the coating had set for three days, the coated metal was bent through 180° over a half inch mandrel and no cracking of the coating occurred.

Example II

Using the silicate-resin component and the pigment component prepared according to Example I, the workable range of combining these components was determined. One hundred grams of the pigment component was combined with various amounts of the silicate-resin component starting with 20 grams and increasing in ten gram increments up to 90 grams.

It was found that the workable combining range is 100 grams of the pigment component to 40–60 grams of the silicate-resin component. When the silicate-resin component was below 40 grams, there was insufficient binder for the pigment resulting in a loss of adhesion. In the range of greater than 60 up to 90 grams of silicate resin, there was a loss of hiding power, the film became brittle and cracked.

Example III

Following the procedure of Example I, a pigmented silicate finish coating was prepared according to the following formulation:

| Ingredients: | Parts by wt. |
|---|---|
| Sodium silicate (27 percent) | 26.0 |
| Chrome green light | 15.0 |
| Calcium sulfate (Wollestenite) | 12.0 |
| Lead carbonate | 4.0 |
| Acrylic resin (Rhoplex AC–33) | 14.0 |
| Water | 19.0 |

This finish coating was found to have properties similar to those of Example I.

We claim:

1. A pigmented silicate coating composition for treating a metal surface with a protective coating capable of self-curing in air under ambient conditions to form insoluble silicates comprising an admixture of two components, one of said components (A) comprising:
   (1) 10–30 parts by weight of an alkali metal silicate solution having a maximum ratio of alkali metal oxide to silica of 1:2; and
   (2) 4–15 parts by weight of an emulsion of an interpolymer comprising an alkyl acrylate-alkyl methacrylate capable of providing a rapid drying insoluble surface film to protect the silicates for a time sufficient to permit exposure of the silicates to the air atmosphere to form insoluble silicates; and the other component (B) being comprised of:
   (1) 15–30 parts by weight of colored pigments;
   (2) 10–20 parts by weight of filler pigments;
   (3) 2–6 parts by weight of salts of metal which react with said silicates to form insoluble metal silicate compounds;

said components (A) and (B) being admixed together just prior to application and having added thereto sufficient water to adjust the viscosity for the mode of application, said parts being given as parts by weight of the total composition.

2. A pigmented silicate coating composition for treating a ferrous metal surface with a protective coating capable of self-curing in air under ambient conditions to form insoluble silicates comprising an admixture of two components, one of said components (A) comprising:
   (1) 10–30 parts by weight of an alkali metal silicate solution having a maximum ratio of alkali metal oxide to silica of 1:2, said alkali metal being selected from the group consisting of sodium and potassium; and
   (2) 4–15 parts by weight of an ethyl acrylate-methyl methacrylate copolymer resin emulsion capable of providing a rapid drying insoluble surface film to protect the silicate for a time sufficient to permit exposure of said silicate to the air atmosphere to form said insoluble silicates; and the other of said components (B) comprising:
   (1) 15–30 parts by weight of colored pigments;
   (2) 10–20 parts by weight of filler pigments;

(3) 2-6 parts by weight of salts of metal which react with said silicates to form insoluble metal silicate compounds, said metal salts containing a metal portion selected from the group consisting of aluminum, barium, calcium, magnesium, manganese, lead and zinc;

said components (A) and (B) being admixed together just prior to application and having added thereto sufficient water to adjust the viscosity for the mode of operation, said parts being given as parts by weight of the total composition.

References Cited by the Examiner

UNITED STATES PATENTS

| | | | |
|---|---|---|---|
| 2,795,564 | 6/1957 | Conn et al. | 260—29.6 |
| 2,904,523 | 9/1959 | Hawkins et al. | 260—29.6 |
| 2,946,695 | 7/1960 | Dietz et al. | 260—29.6 |
| 3,016,358 | 1/1962 | Hustinx | 260—29.6 |

MURRAY TILLMAN, *Primary Examiner.*

J. ZEIGLER, *Assistant Examiner.*